(12) United States Patent
Hirota et al.

(10) Patent No.: US 10,435,003 B2
(45) Date of Patent: Oct. 8, 2019

(54) NEGATIVE PRESSURE-TYPE BOOSTER DEVICE

(71) Applicant: ADVICS CO., LTD., Kariya-shi, Aichi-ken (JP)

(72) Inventors: Nobuyuki Hirota, Miyoshi (JP); Minoru Watanabe, Nisshin (JP); Yu Furuta, Okazaki (JP); Yoji Inoue, Toyoake (JP); Eri Tanimoto, Nagoya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 212 days.

(21) Appl. No.: 15/511,566

(22) PCT Filed: Mar. 31, 2016

(86) PCT No.: PCT/JP2016/060758
§ 371 (c)(1),
(2) Date: Mar. 15, 2017

(87) PCT Pub. No.: WO2016/159275
PCT Pub. Date: Oct. 6, 2016

(65) Prior Publication Data
US 2017/0291588 A1    Oct. 12, 2017

(30) Foreign Application Priority Data
Mar. 31, 2015    (JP) ................................. 2015-074264

(51) Int. Cl.
*B60T 13/57*    (2006.01)
(52) U.S. Cl.
CPC .................................. *B60T 13/57* (2013.01)

(58) Field of Classification Search
CPC ...... B60T 17/22; B60T 13/662; B60T 13/686; B60T 13/745; B60T 8/4077; B60T 13/146; B60T 17/221
See application file for complete search history.

(56) References Cited

U.S. PATENT DOCUMENTS

| | | | | |
|---|---|---|---|---|
| 2011/0303083 A1* | 12/2011 | Price | ....................... | B60T 13/57 91/377 |
| 2012/0111184 A1* | 5/2012 | Grace | ..................... | B60T 13/57 91/376 R |
| 2015/0314766 A1* | 11/2015 | Berthomieu | ........ | B60T 13/5675 403/349 |

FOREIGN PATENT DOCUMENTS

JP    8-268265 A    10/1996

OTHER PUBLICATIONS

International Search Report (PCT/ISA/210) dated May 31, 2016, by the Japanese Patent Office as the International Searching Authority for International Application No. PCT/JP2016/060758.

(Continued)

*Primary Examiner* — Abiy Teka
(74) *Attorney, Agent, or Firm* — Buchanan Ingersoll & Rooney PC

(57) ABSTRACT

A valve mechanism of this negative pressure type booster device has: a negative pressure valve seat provided on a valve body; an atmospheric valve seat provided on a plunger; and a valve part provided with a negative pressure valve section constituting a negative pressure valve together with the negative pressure valve seat and an atmospheric valve section constituting an atmospheric valve together with the atmospheric valve seat. The valve mechanism is provided with a tilting part which is provided on at least one of the valve body and the valve part and tilts the atmospheric valve section relative to a first plane formed when the negative pressure valve section and the negative pressure (Continued)

valve seat are brought into contact with each other to put the negative pressure valve in a closed state.

6 Claims, 14 Drawing Sheets

(56) References Cited

OTHER PUBLICATIONS

Written Opinion (PCT/ISA/237) dated May 31, 2016, by the Japanese Patent Office as the International Searching Authority for International Application No. PCT/ JP2016/060758.

* cited by examiner

Fig. 6
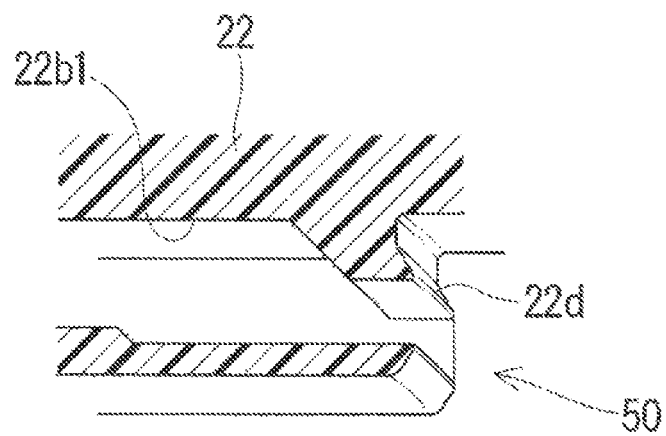
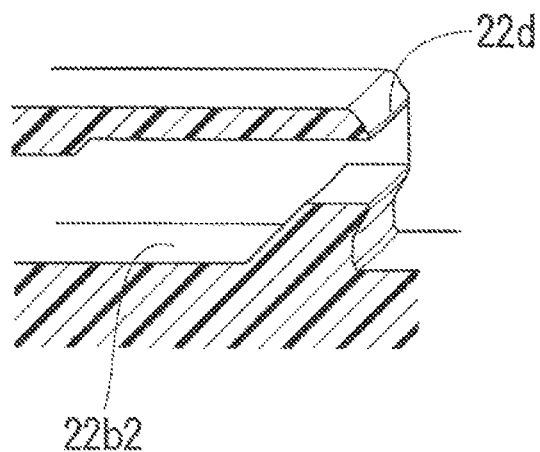

NEGATIVE PRESSURE-TYPE BOOSTER DEVICE

TECHNICAL FIELD

The present invention relates to a negative pressure-type booster device.

BACKGROUND ART

As one type of the negative pressure-type booster device, one described in Patent Literature 1 is known. As shown in FIG. 4 in Patent Literature 1, in the negative pressure-type booster device, a control valve includes a control valve 61 biased by a spring 60 toward a valve plunger 42, a sheet plane 151e of a power piston 151, and an atmospheric-pressure control sheet part 421a disposed at a rear end of a first valve plunger 421. The atmospheric-pressure control sheet part 421a has an approximately semispherical shape, and the center of the approximately semispherical atmospheric-pressure control sheet part 421a decenters in a direction orthogonal to the axis line of the valve plunger 42. The decentering of the center of the approximately semispherical atmospheric-pressure control sheet part 421a allows a lower part of a seal plane 611 and a lower part of the sheet plane 151e to be in contact with each other in an inactive state.

In this manner, the approximately semispherical atmospheric-pressure control sheet part 421a shortens a moving distance of a push rod 41 to the left on the drawing plane with respect to the power piston 151 from the inactive state to the active state of the negative pressure-type booster device to improve a brake feeling.

CITATIONS LIST

Patent Literature

Patent Literature 1: Japanese Unexamined Patent Publication No. H08-268265

SUMMARY OF THE INVENTION

Technical Problems

In the negative pressure-type booster device described above, the approximately semispherical atmospheric-pressure control sheet part 421a decentering in a direction orthogonal to the axis line of the valve plunger 42 cannot be easily processed with respect to the valve plunger 42 at a high accuracy. More specifically, when the approximately semispherical atmospheric-pressure control sheet part 421a largely fluctuates in size, a flow rate (flow) of atmospheric air flowing into a variable-pressure chamber when the brake is operated (active state of the negative pressure-type booster device) fluctuates, and deterioration in brake feeling is concerned. In addition, since the step of causing the center of the approximately semispherical atmospheric-pressure control sheet part 421a to decenter after an atmospheric-pressure valve seat is molded is required, deterioration in productivity is concerned.

Thus the present invention has been made to solve the above problem, and its object is to provide a negative pressure-type booster device which is improved in brake feeling without deteriorating productivity.

Solutions to Problems

In order to solve the above problem, as a constitutional characteristic of the invention according to claim 1, the negative pressure-type booster device includes a valve mechanism including: a movable partition member dividing the inside of a housing into a negative-pressure chamber and a variable-pressure chamber; a valve body reciprocally mounted in the housing and coupled to the movable partition member in the housing; an air valve which is disposed in an axial hole formed in the valve body, can be reciprocated along an axial direction of the axial hole with respect to the valve body, and moves integrally with an input member; a negative-pressure valve communicating/blocking the negative-pressure chamber with/from the variable-pressure chamber depending on reciprocation of the air valve with respect to the valve body; and an atmospheric-pressure valve communicating/blocking the variable-pressure chamber with/from atmospheric air, wherein the valve mechanism has a valve part in which a negative-pressure valve seat disposed on the valve body, an atmospheric-pressure valve seat disposed on the air valve, a negative-pressure valve section constituting the negative-pressure valve together with the negative-pressure valve seat, and an atmospheric-pressure valve section constituting the atmospheric-pressure valve together with the atmospheric-pressure valve seat are disposed, and includes a tilting part which is formed at least any one of the valve body and the valve part and relatively tilts the atmospheric-pressure valve section with respect to a first plane formed when the negative-pressure valve section and the negative-pressure valve seat are bought into contact with each other to set the negative-pressure valve in a blocking state.

Effects of Invention

According to this, an atmospheric-pressure valve section of the atmospheric-pressure valve is tilted by the tilting part relatively with respect to a first plane formed when the negative-pressure valve is set in a blocking state (closed state). On the other hand, in an inactive state of the negative pressure-type booster device, before the negative-pressure valve section and the negative-pressure valve seat are in contact with each other and the atmospheric-pressure valve section and the atmospheric-pressure valve seat are separated from each other, the atmospheric-pressure valve section of the atmospheric-pressure valve is in contact with the atmospheric-pressure valve seat while being elastically deformed. When the negative pressure-type booster device is activated, in particular, when the atmospheric-pressure valve is changed from a closed state to an open state, the elastic deformation of the atmospheric-pressure valve section is gradually canceled by the tilting part to make it possible to gradually separate the atmospheric-pressure valve section from the atmospheric-pressure valve seat. At this time, a fluctuation (disturbance) in flow of the atmospheric air flowing into the variable-pressure chamber through the atmospheric-pressure valve can be suppressed to make it possible to suppress deterioration in braking feeling. Since the tilting part is formed on at least one of the valve body and the valve part, the valve body and the valve part can be manufactured in a relatively small number of steps. More specifically, in comparison with a conventional technique, deterioration in productivity can be suppressed. Thus, a negative pressure-type booster device the brake feeling of which is further improved without deteriorating the productivity can be provided.

BRIEF DESCRIPTION OF THE DRAWINGS

FIG. 6 is a partially enlarged sectional view of a valve body (tilting part) in accordance with a first modification of the first embodiment of a negative pressure-type booster device according to the present invention.

DESCRIPTION OF EMBODIMENTS

First Embodiment

Figure 1:
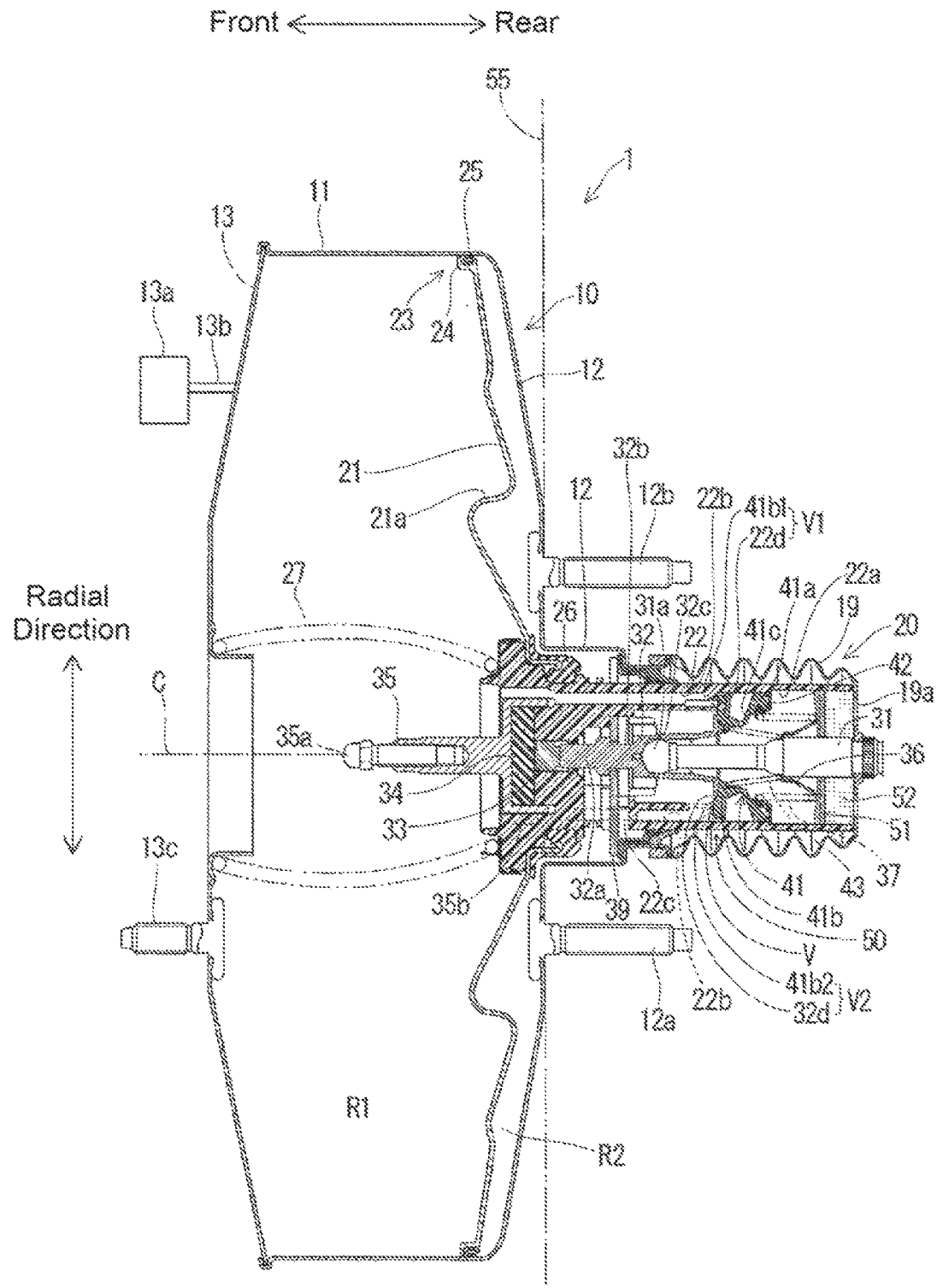
FIG. 1 is a sectional view showing a first embodiment of a negative pressure-type booster device according to the present invention.

A negative pressure-type booster device according to a first embodiment of the present invention will be described below with reference to the accompanying drawings. As shown in FIG. 1, in a negative pressure-type booster device 1, a power piston 20 including a movable partition member 21 and a valve body 22 is mounted in a housing 10 such that the power piston 20 can move forward and backward (horizontal direction in FIG. 1), and the inside of the housing 10 is divided by the movable partition member 21 into a front negative-pressure chamber R1 and a rear variable-pressure chamber R2.

The housing 10 is made of a metal material and formed in a hollow cylindrical shape, and has a side plate part 11 and both bottom plate parts 12 and 13 disposed on both sides thereof. The side plate part 11 is formed in a cylindrical shape. The rear bottom plate part 12 is formed in a plate-like shape, and has an outer peripheral end integrally fixed to a rear end of the side plate part 11. The side plate part 11 and the rear bottom plate part 12 form a main body housing having an approximately bottomed cylindrical shape. The front bottom plate part 13 is formed in a plate-like shape, and has an outer peripheral end mounted to be fixed to a front end of the side plate part 11. In the embodiment, the front bottom plate part 13 is clamped on the side plate part 11. The front bottom plate part 13 includes a negative-pressure feed pipe 13b to cause the negative-pressure chamber R1 to always communicate with a negative-pressure source 13a (for example, an intake manifold of an engine (not shown)).

In the embodiment, the housing 10 is preferably formed in a cylindrical shape. The housing 10 may be formed in a square-cylindrical shape. The housing 10 may be formed in a shell-like shape.

The rear bottom plate part 12 is fixed to a stationary member, i.e., a mounting-target member 55 of a vehicle by a plurality of mounting bolts 12a and 12b which airtightly penetrates the rear bottom plate part 12. In this manner, the housing 10 is fixed to the mounting-target member 55 of the vehicle. The front bottom plate part 13 is configured such that a brake master cylinder (not shown) is supported by a plurality of mounting bolts 13c which airtightly penetrates the front bottom plate part 13.

The brake master cylinder is popularly known, and is airtightly mounted on the front bottom plate part 13 at a rear end of the cylinder main body (not shown). A piston (not shown) of the brake master cylinder is configured to project backward from the cylinder main body, to protrude into the negative-pressure chamber R1, and to be pushed and moved forward by a distal end 35a of an output shaft 35 (will be described later).

The movable partition member 21 divides the inside of the housing 10 into the negative-pressure chamber R1 and the variable-pressure chamber R2 and reciprocates along an extending direction of a center line C (center line (axial line) of a plunger 32) of the housing 10.

The movable partition member 21 is formed in an annular shape, and arranged coaxially with the cylindrical side plate part 11. The movable partition member 21 is different from the valve body 22 and made of a metal material. The movable partition member 21 may be made of a resin material like the valve body 22. In the embodiment, the movable partition member 21 is preferably formed in an annular shape. The contour of the outer peripheral end of the movable partition member 21 is formed in a circular shape, and the movable partition member 21 is disposed such that the movable partition member 21 can reciprocate along an extending direction of the center line C of the housing 10 with a predetermined gap between the movable partition member 21 and the inner wall surface of the side plate part 11 formed in a cylindrical shape.

The movable partition member 21 is not planar, and has a bent part 21a. The bent part 21a can improve the strength.

On the outer peripheral edge of the movable partition member 21, a first seal part 23 blocking the communication between the negative-pressure chamber R1 and the variable-pressure chamber R2 is disposed.

Figure 2:
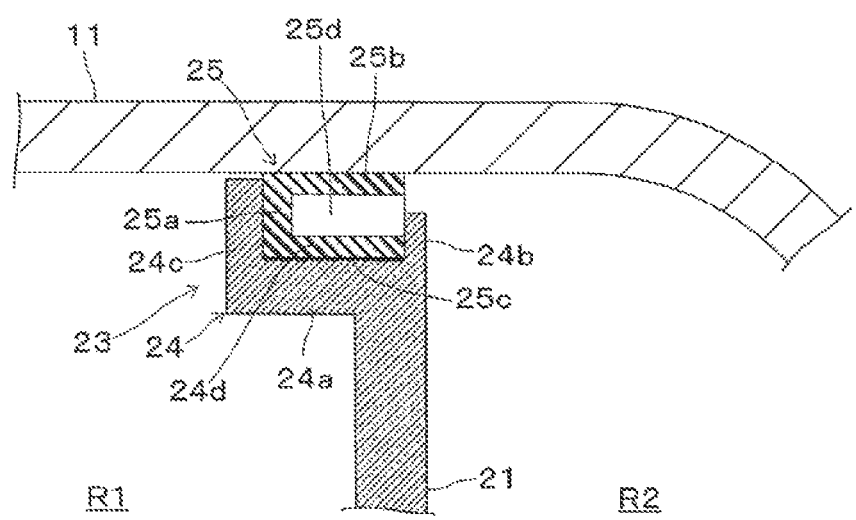
FIG. 2 is an enlarged sectional view mainly showing a first seal part shown in FIG. 1.

The first seal part 23, as shown in FIG. 1 and FIG. 2, includes a first annular concave part 24d and an annular first cup seal 25.

The first annular concave part 24*d*, as mainly shown in FIG. 2, is formed over the circumference of the outer peripheral edge of the movable partition member 21 and opens toward the inner wall surface of the side plate part 11 of the housing 10. The first annular concave part 24*d* is formed in a holding part 24 having a U-shaped section and formed over the circumference of the outer peripheral edge of the movable partition member 21.

The holding part 24 includes an annular base part 24*a* extending in the extending direction of the center line C of the housing 10, an annular rear projecting part 24*b* extending from a rear-side end of the base part 24*a* toward the radial outward of the housing 10, and an annular front projecting part 24*c* extending from a front-side end of the base part 24*a* to a radial outward of the housing 10. The first annular concave part 24*d* is a concave part formed by the base part 24*a*, the rear projecting part 24*b*, and the front projecting part 24*c*. The base part 24*a* is disposed integrally with the outer peripheral end of the movable partition member 21.

The rear projecting part 24*b* is set to be shorter than the front projecting part 24*c*, a gap between the rear projecting part 24*b* and the inner wall surface of the side plate part 11 is set to be larger than a gap between the rear projecting part 24*b* and the front projecting part 24*c*. The rear projecting part 24*b* is set to have a length not to prevent the communication between an internal space 25*d* of the first cup seal 25 and the variable-pressure chamber R2 from being blocked.

The first cup seal 25 is held to be housed in the first annular concave part 24*d*, is formed to have a U-shaped section, and opens toward the variable-pressure chamber R2 side, the internal space 25*d* communicating with the variable-pressure chamber R2. The first cup seal 25 is made of an elastic material such as a rubber material or a silicon material (having elasticity).

The first cup seal 25, as shown in FIG. 2, includes an annular first base part 25*a* extending along a radial direction of the housing 10, an annular first outer lip part 25*b* extending from an outer peripheral side end of a first base part 25*a* toward the variable-pressure chamber R2 side and being in airtight and slidable contact with the inner wall surface of the side plate part 11, an annular first inner lip part 25*c* extending from an inner peripheral side end of the first base part 25*a* toward the variable-pressure chamber R2 side, and the internal space 25*d* formed by the first base part 25*a*, the first outer lip part 25*b*, and the first inner lip part 25*c*.

The inner peripheral edge of the movable partition member 21, as shown in FIG. 1, is airtightly fixed to an outer periphery of the valve body 22 by a fixing member 26 made of an elastic material (for example, rubber material) and having an annular shape.

The valve body 22 of the power piston 20 is reciprocably mounted on the housing 10 and connected to the movable partition member 21 in the housing 10.

The valve body 22, as shown in FIG. 1, is a resin hollow body connected to an inner periphery of the movable partition member 21, and is airtightly mounted on the rear bottom plate part 12 of the housing 10 at an intermediate portion formed in a cylindrical shape such that the valve body 22 can be moved forward and backward (axial direction of the power piston 20). The valve body 22 is biased backward by a return spring 27 interposed between the valve body 22 and the front bottom plate part 13 of the housing 10. A portion of the valve body 22 projecting to the outside of the housing 10 is covered and protected by a boot 19 having a plurality of vent holes 19*a* at the rear end thereof. The valve body 22 is manufactured by molding (for example, injection molding).

Figure 3:
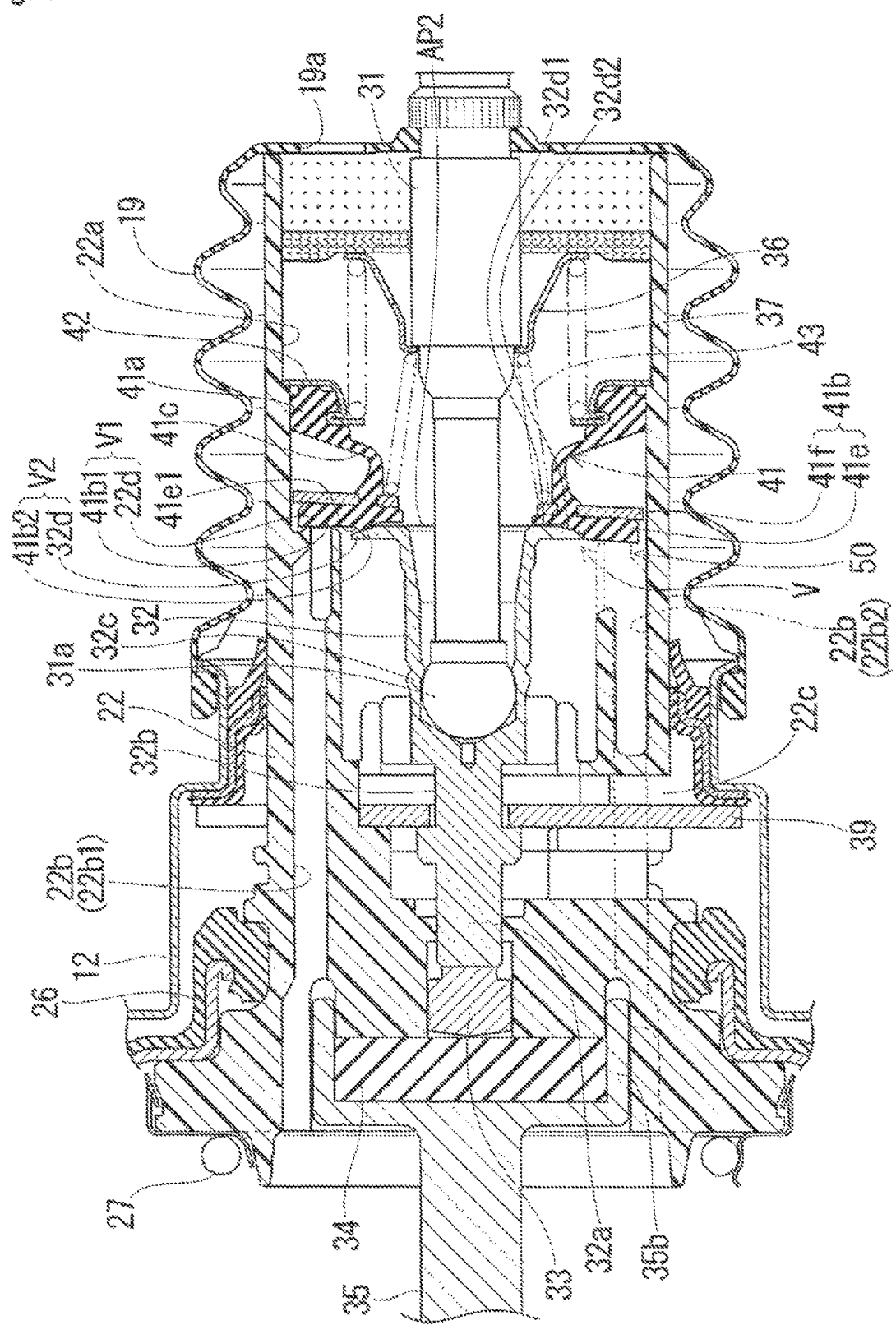
FIG. 3 is an enlarged sectional view mainly showing a valve body shown in FIG. 1, and shows a case in which both a negative-pressure valve and an atmospheric-pressure valve are set in a closed state.

In the valve body 22, as shown in FIG. 1 and FIG. 3, a stepped axial hole 22*a* penetrating forward and backward is formed. In the valve body 22, one pair of negative-pressure communicating paths 22*b*1 and 22*b*2 communicating with an intermediate step of the axial hole 22*a* at the rear end thereof and communicating with the negative-pressure chamber R1 at the front end thereof are formed. In the valve body 22, a key mounting hole 22*c* which is approximately orthogonal to a front portion of the axial hole 22*a* and into which a key member 39 can be inserted from the outer periphery.

Figure 4:
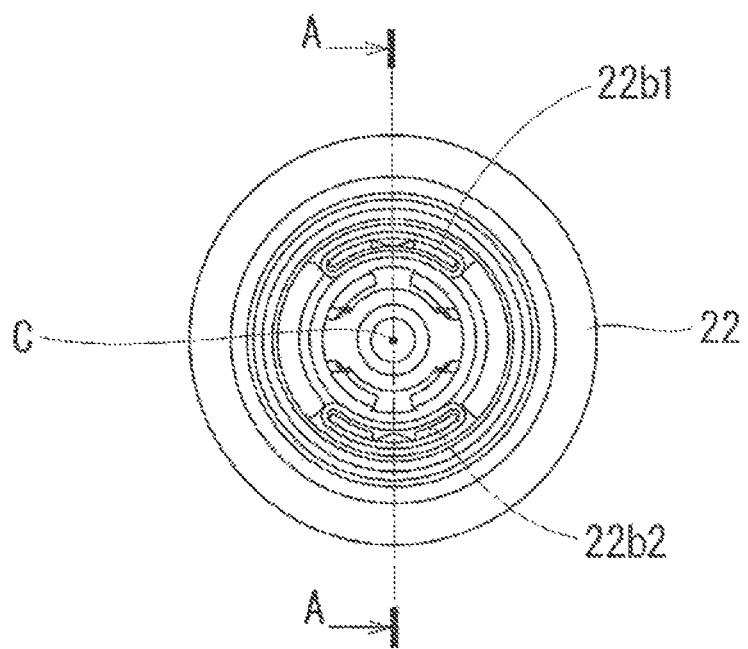
FIG. 4 is a diagram showing the valve body shown in FIG. 1 when viewed from the back.

The negative-pressure communicating path 22*b*1 which is the one pair of negative-pressure communicating paths 22*b* is located at an upper side on the drawing plane in FIG. 3 and FIG. 4, and the negative-pressure communicating path 22*b*2 which is the other is located at a lower side on the drawing plane in FIG. 3 and FIG. 4. The one pair of negative-pressure communicating paths 22*b*1 and 22*b*2 are formed to have circular arc sections and the same shapes, respectively, and symmetrically disposed about a center line (the same as the center line C) of the valve body 22.

Figure 5:
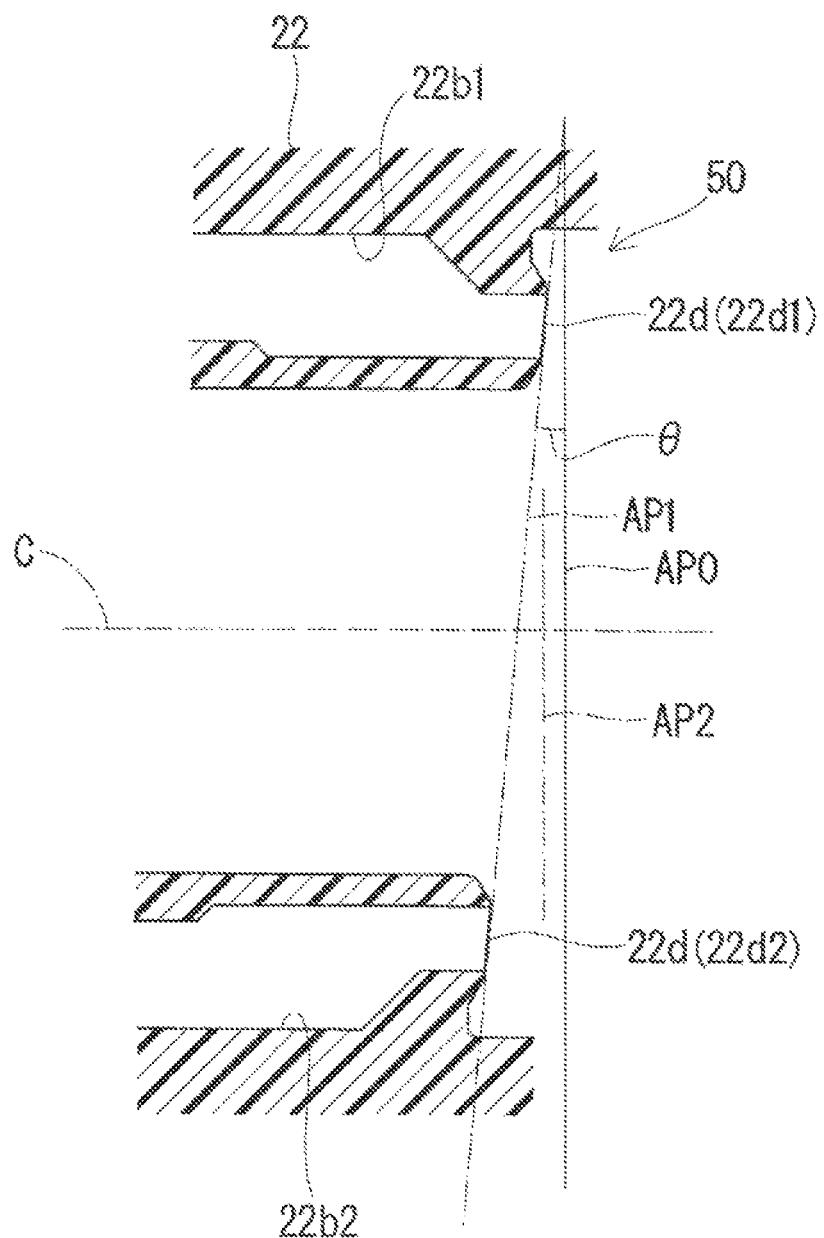
FIG. 5 is a partially enlarged sectional view along an A-A line shown in FIG. 4.

Furthermore, a right end face of the negative-pressure communicating path 22*b*1, i.e., an end face on which a negative-pressure valve seat 22*d* (22*d*1) is formed, as shown in FIG. 5, is formed to be inclined by a predetermined angle θ with respect to a plane AP0 orthogonal to the center line of the valve body 22. A plane including the right end face of the negative-pressure communicating path 22*b*1 is a plane AP1. A right end face of the negative-pressure communicating path 22*b*2, i.e., an end face on which the negative-pressure valve seat 22*d* (22*d*2) is formed is also inclined by the predetermined angle θ with respect to the plane AP0, i.e., formed on the plane AP1. In FIG. 4, the plane AP1 (end face on which the negative-pressure valve seat 22*d* is formed) is inclined in vertical directions with respect to the drawing plane. The plane AP1 is formed in a tapered shape such that an upper side is at a high level and a lower side is at a low level. More specifically, a tilting part 50 is formed in a tapered shape inclined with respect to the plane AP0 (second plane).

In other words, since a negative-pressure valve seat 22*d*1 (will be described later) is formed on the right end face of the negative-pressure communicating path 22*b*1, the negative-pressure valve seat 22*d*1 is formed on the plane AP1 formed to be inclined by the predetermined angle θ with respect to the plane AP0. In addition, since a negative-pressure valve seat 22*d*2 is also formed on the right end face of the negative-pressure communicating path 22*b*2, the negative-pressure valve seat 22*d*2 is formed on the plane AP1 formed to be inclined by the predetermined angle θ with respect to the plane AP0. Furthermore, both the negative-pressure valve seats 22*d* are formed on the same plane AP1. In this manner, the negative-pressure valve seat 22*d* is inclined by the predetermined angle θ with respect to the plane AP0 to configure the tilting part 50. The tilting part 50 relatively inclines (tilts) an atmospheric-pressure valve section 41*b*2 with respect to the plane AP1 serving as a first plane formed when a negative-pressure valve section 41*b*1 and the negative-pressure valve seat 22*d* are in contact with each other to block a negative-pressure valve V1. When the negative-pressure valve section 41*b*1 and the negative-pressure valve seat 22*d* are in contact with each other, the tilting part 50 may tilt the atmospheric-pressure valve section 41*b*2 in comparison with the atmospheric-pressure valve section 41*b*2 obtained before the contact with respect to a plane AP2 (The plane is a plane formed on an atmospheric-pressure valve seat 32*d* and in contact with the atmospheric-pressure valve section 41*b*2 (will be described later)) being in contact with the atmospheric-pressure valve section 41*b*2 on an atmospheric-pressure valve seat 32*d*.

In the axial hole 22*a* described above, an input shaft 31 and the plunger 32 (corresponding to an air valve) are coaxially mounted, and a valve mechanism V and filters 51 and 52 are coaxially mounted. In the axial hole 22*a*, in front of the plunger 32, a coupling member 33, a reaction member 34, and an output shaft (output member) 35 are coaxially mounted.

The input shaft 31 can reciprocate with respect to the valve body 22, and is coupled to a receiving coupling part 32*c* of the plunger 32 at a spherical distal end 31*a* like a joint. The input shaft 31 is coupled to a brake pedal (not shown) through a yoke (not shown) by a rear-end screw part (not shown), and is configured to forward receive a pressing force acting on the brake pedal as an input. The input shaft 31 is an input member to input the pressing force to a master cylinder. The input shaft 31 is engaged with a return spring 37 through a retainer 36 engaged with the intermediate step and is biased backward by the return spring 37. The plunger 32 coupled to the input shaft 31 is also biased backward by the return spring 37.

The plunger 32 can be brought into contact with a center portion of a rear surface of the reaction member 34 through the coupling member 33 at a distal end 32*a* thereof. The distal end 32*a* is a part partially receiving a reaction force of an output from the reaction member 34 through the coupling member 33. The plunger 32 can be engaged with the key member 39 at an annular groove part 32*b* formed in the intermediate part of the plunger 32. At a rear end of the plunger 32, the annular atmospheric-pressure valve seat 32*d* in the valve mechanism V is formed.

The atmospheric-pressure valve seat 32*d*, as shown in FIG. 3, includes a flat surface 32*d*1 formed in an annular and planar shape and an inclined surface 32*d*2 formed on the outer periphery of the flat surface 32*d*1. The flat surface 32*d*1 is a plane formed on the atmospheric-pressure valve seat 32*d* and being in contact with atmospheric-pressure valve section 41*b*2, and is included in the plane AP2. The plane AP2 is parallel with or the same as the plane AP0 orthogonal to a center line of the valve body 22.

The reaction member 34 has a center portion on the rear surface thereof which can be swelled and deformed backward, is housed in a backward cylindrical part 35*b* of the output shaft 35 and engaged (in contact with) a rear-end rear surface of the output shaft 35 on the entire front surface, and is mounted on a front end of the valve body 22 together with the backward cylindrical part 35*b* of the output shaft 35. The reaction member 34, on the rear surface thereof, can be brought into contact with the front surface of the distal end 32*a* of the plunger 32 through the coupling member 33, and is brought into contact with an annular front end face of the valve body 22.

The output shaft 35 is mounted in the front end of the axial hole 22*a* of the valve body 22 together with the reaction member 34 such that the output shaft 35 can move forward and backward. The output shaft 35 is in contact with an engagement part (concave part) of the piston in the brake master cylinder at the distal end 35*a* such that the output shaft 35 can be pushed and moved. The output shaft 35 is designed to transmit a reaction force received from the piston of the brake master cylinder to the reaction member 34 in a brake operating state.

The key member 39 can be brought into contact with and detached from the valve body 22, the plunger 32, and the housing 10 and regulates a moving distance along the axial direction of the plunger 32 with respect to the valve body 22. The key member 39 has a function of regulating forward and backward movement of the plunger 32 with respect to the valve body 22 of the power piston 20 and a function of regulating a backward movement limit position (backward return position of the valve body 22) of the power piston 20 with respect to the housing 10. The key member 39 is mounted to be able to relatively move by a required distance along the axial direction of the power piston 20 with respect to the valve body 22 and the plunger 32, respectively.

The valve mechanism V includes the negative-pressure valve V1 which communicates and blocks the negative-pressure chamber R1 with/from the variable-pressure chamber R2 depending on reciprocation of the plunger 32 with respect to the valve body 22 and an atmospheric-pressure valve V2 which communicates and blocks the variable-pressure chamber R2 with/from the atmospheric air. The valve mechanism V includes the negative-pressure valve seat 22*d* disposed on the valve body 22. The negative-pressure valve seat 22*d* is integrally formed on the rear end of the negative-pressure communicating paths 22*b* in the valve body 22. The negative-pressure valve seat 22*d* is formed in a circular arc shape or a circular shape.

The valve mechanism V includes the atmospheric-pressure valve seat 32*d* disposed on the plunger 32. The atmospheric-pressure valve seat 32*d* is integrally formed on the rear end of the plunger 32 in an annular shape.

The valve mechanism V includes a valve part 41. On the valve part 41, the negative-pressure valve section 41*b*1 constituting the negative-pressure valve V1 together with the negative-pressure valve seat 22*d* and the atmospheric-pressure valve section 41*b*2 constituting the atmospheric-pressure valve V2 together with the atmospheric-pressure valve seat 32*d* are disposed. The valve part 41 is made of an elastic member (for example, a rubber material or a silicon material (having elasticity)).

The valve part 41 has an annular mounting part 41*a* mounted on the valve body 22 and a cylindrical movable part 41*b* which is integrally formed on the annular mounting part 41*a* and can move in the axial direction.

The mounting part 41*a* is airtightly mounted in the axial hole 22*a* of the valve body 22 and fixed and held at a predetermined position (step) of the axial hole 22*a* in the valve body 22 by a retainer 42. The retainer 42 is biased forward by the return spring 37 and fixed to the step of the axial hole 22*a* in the valve body 22.

The movable part 41*b* is coupled to the mounting part 41*a* through a connection part 41*c* and can relatively move with respect to the mounting part 41*a*. The movable part 41*b* has the negative-pressure valve section 41*b*1 which can be seated and detached on/from the negative-pressure valve seat 22*d* and constitutes the negative-pressure valve V1 which can communicate/block the negative-pressure chamber R1 with/from the variable-pressure chamber R2 together with the negative-pressure valve seat 22*d*. The movable part 41*b* has the atmospheric-pressure valve section 41*b*2 which can be seated/detached on/from the atmospheric-pressure valve seat 32*d* and constitutes the atmospheric-pressure valve V2 which can communicate/block the variable-pressure chamber R2 with/from the atmospheric air together with the atmospheric-pressure valve seat 32*d*. The movable part 41*b* is biased forward by a compression spring 43.

The movable part 41*b* includes an elastic movable part 41*e* made of an elastic member and a metal movable part 41*f* made of a metal material fixed on the rear surface of the elastic movable part 41e and formed in an annular plate-like shape. The elastic movable part 41e is integrally connected to the connection part 41c. The movable part 41b (consequently, the valve part 41) is integrally formed by vulcanization molding or the like.

The elastic movable part 41e is an elastic plate member formed in an annular shape and has an approximately uniform thickness. On a side of the elastic movable part 41e with which the atmospheric-pressure valve seat 32d is in contact, an annular projecting part 41e1 is formed. With regard to a thickness of the elastic movable part 41e, a thickness of an inner part than the projecting part 41e1 is smaller than that of an outer part. An area including at least the inner part than the projecting part 41e1 is a part (atmospheric-pressure valve section 41b2) being in contact with the atmospheric-pressure valve seat 32d. An outer area than the projecting part 41e1 is a part (negative-pressure valve section 41b1) being in contact with the negative-pressure valve seat 22d.

The metal movable part 41f is a metal plate member formed in an annular shape and has a uniform thickness. In the metal movable part 41f, a plurality of through-holes to connect the elastic movable part 41e to the connection part 41c are formed.

An operation (in particular, the valve mechanism V) of the negative pressure-type booster device 1 according to the first embodiment described above will be described below. The configuration of the valve mechanism V described above allows the variable-pressure chamber R2 to communicate with the negative-pressure chamber R1 or the atmospheric air depending on forward/backward movement of the input shaft 31 and the plunger 32 with respect to the valve body 22. More specifically, the input shaft 31 and the plunger 32 move forward from an original position (return position) with respect to the valve body 22 to seat the negative-pressure valve section 41b1 on the negative-pressure valve seat 22d.

More specifically, the negative-pressure valve section 41b1 is seated on one negative-pressure valve seat 22d1 and the other negative-pressure valve seat 22d2. At this time, since one negative-pressure valve seat 22d1 and the other negative-pressure valve seat 22d2 are formed to be inclined by the predetermined angle θ with respect to the plane AP0, the negative-pressure valve section 41b1, consequently, the atmospheric-pressure valve section 41b2 and the movable part 41b are tilted by the tilting part 50.

Until the negative-pressure valve section 41b1 is seated on one negative-pressure valve seat 22d1, the atmospheric-pressure valve seat 32d and the atmospheric-pressure valve section 41b2 are kept seated. At this time, the atmospheric-pressure valve seat 32d and the movable part 41b are equally seated, an amount of deformation of a part (atmospheric-pressure valve section 41b2) of the elastic movable part 41e with which the atmospheric-pressure valve seat 32d is in contact is uniform.

After the negative-pressure valve section 41b1 is seated on the one negative-pressure valve seat 22d1 (upper negative-pressure valve seat 22d1), until the negative-pressure valve section 41b1 is seated on the other negative-pressure valve seat 22d2 (lower negative-pressure valve seat 22d2) the elastic movable part 41e on the other negative-pressure valve seat 22d2 side is biased by the compression spring 43 and moved forward. At this time, the atmospheric-pressure valve seat 32d and the atmospheric-pressure valve section 41b2 are kept seated. Furthermore, since the movable part 41b (elastic movable part 41e) is tilted, as shown in FIG. 3 and FIG. 5, an amount of deformation of a part (atmospheric-pressure valve section 41b2) of the elastic movable part 41e on the other negative-pressure valve seat 22d2 side becomes larger than that on the one negative-pressure valve seat 22d1 side. In other words, the thickness of the elastic movable part 41e on the other negative-pressure valve seat 22d2 side is smaller than that on the one negative-pressure valve seat 22d1 side due to elastic deformation. Since the plunger 32 does not axially wobble, the atmospheric-pressure valve seat 32d is not tilted. For this reason, the atmospheric-pressure valve section 41b2 is elastically deformed.

Furthermore, when the input shaft 31 and the plunger 32 move forward with respect to the valve body 22, the atmospheric-pressure valve seat 32d is detached from the atmospheric-pressure valve section 41b2.

More specifically, the atmospheric-pressure valve seat 32d is gradually detached from the atmospheric-pressure valve section 41b2 from the one negative-pressure valve seat 22d1 side. As a result, a fluctuation (disturbance) in flow of the atmospheric air flowing into the variable-pressure chamber R2 through the atmospheric-pressure valve V2 can be suppressed to make it possible to suppress deterioration in braking feeling. In other words, when the negative-pressure valve section 41b1 and the negative-pressure valve seat 22d are in contact with each other, the tilting part 50 tilts the plane AP1 being in contact with the atmospheric-pressure valve seat 32d of the atmospheric-pressure valve section 41b2 with respect to the plane AP2 formed on the atmospheric-pressure valve seat 32d and being in contact with the atmospheric-pressure valve section 41b2.

When the atmospheric-pressure valve seat 32d is completely detached from the atmospheric-pressure valve section 41b2, communication between the variable-pressure chamber R2 and the negative-pressure chamber R1 is blocked to cause the variable-pressure chamber R2 communicate with the atmospheric air. The elastic movable part 41e, i.e., an atmospheric-pressure valve section 41b2 returns to an original shape which is not pressed. The negative-pressure valve V1 is closed, and the atmospheric-pressure valve section 41b2 is parallel with or the same as the plane AP1. At this time, the atmospheric air flows into the variable-pressure chamber R2 through vent holes 19a of the boot 19, the filters 51 and 52, and the inside of the valve part 41, the gap between the atmospheric-pressure valve seat 32d and the atmospheric-pressure valve section 41b2, a communicating path formed in the valve body 22, and the like.

In a state in which the input shaft 31 and the plunger 32 return to the return positions (original positions) with respect to the valve body 22, the atmospheric-pressure valve seat 32d is seated on the atmospheric-pressure valve section 41b2, and the negative-pressure valve section 41b1 is detached from the negative-pressure valve seat 22d (i.e., a state in which the atmospheric-pressure valve V2 is closed, the communication between the variable-pressure chamber R2 and the atmospheric air is blocked, the negative-pressure valve V1 opens, and the negative-pressure chamber R1 communicates with the variable-pressure chamber R2), the communication between the variable-pressure chamber R2 and the atmospheric air is blocked to cause the variable-pressure chamber R2 to communicate with the negative-pressure chamber R1. The negative-pressure valve V1 opens, the atmospheric-pressure valve V2 is closed, and the atmospheric-pressure valve section 41d2 is parallel with the plane AP0. At this time, air is sucked and flows from the variable-pressure chamber R2 into the negative-pressure chamber R1 through the communicating path formed in the valve body 22, the gap between the negative-pressure valve section 41b1 and the negative-pressure valve seat 22d, the negative-pressure communicating paths 22b, and the like.

An operation (in particular, the movable partition member 21) of the negative pressure-type booster device 1 according to the first embodiment described above will be described below. The brake pedal is pressed, and the pressing force allows the valve body 22, consequently, the power piston 20 to move forward. Furthermore, since the variable-pressure chamber R2 communicates with the atmospheric air to cause the pressure in the negative-pressure chamber R1 to be higher than that in the variable-pressure chamber R2, the movable partition member 21, consequently the power piston 20 is further pressed forward and moved.

At this time, since the pressure in the variable-pressure chamber R2 is higher than that in the negative-pressure chamber R1, the first cup seal 25 communicating with the variable-pressure chamber R2 expands to the outside. As a result, the adhesiveness between the first base part 25a and the front projecting part 24c is improved, the adhesiveness between the first outer lip part 25b and the side plate part 11 is improved, and the adhesiveness between the first inner lip part 25c and the base part 24a is improved. Thus, since the sealing property of the first seal part 23 is improved, the movable partition member 21 can move forward while keeping the sealing property high.

Furthermore, according to the above result, axial wobbling of the movable partition member 21 with respect to the housing 10 is suppressed, and, consequently, axial wobbling of the valve body 22 to which the movable partition member 21 is coupled with respect to the housing 10 is also suppressed. As a result, when the atmospheric-pressure valve V2 opens, a variation in inlet flow of the atmospheric air caused by vibration, consequently, axial wobbling of the valve body 22 caused by a fluctuation (disturbance) in flow of the atmospheric air flowing into the variable-pressure chamber R2 through the atmospheric-pressure valve V2 can be reliably suppressed. Thus, the brake feeling of the negative pressure-type booster device 1 can be further improved.

On the other hand, when the stepping-on of the brake pedal is canceled, the variable-pressure chamber R2 communicates with the negative-pressure chamber R1 and is blocked from communicating with the atmospheric air. In this state, the biasing force of the return spring 27 allows the movable partition member 21, consequently, the power piston 20 to be pressed backward and moved.

At this time, since in the negative-pressure chamber R1 and the variable-pressure chamber R2 have equal negative pressures, the first cup seal 25 communicating with the variable-pressure chamber R2 less expands or does not expand to the outside. As a result, the adhesiveness between the first base part 25a and the front projecting part 24c is deteriorated, the adhesiveness between the first outer lip part 25b and the side plate part 11 is deteriorated, and the adhesiveness between the first inner lip part 25c and the base part 24a is deteriorated. Thus, since the sealing property of the first seal part 23 is reduced, the movable partition member 21 can be easily moved backward.

As is apparent from the above explanation, the negative pressure-type booster device 1 according to the first embodiment is a negative pressure-type booster device 1 including the valve mechanism V including a movable partition member 21 dividing the inside of the housing 10 into the negative-pressure chamber R1 and the variable-pressure chamber R2, the valve body 22 reciprocally mounted in the housing 10 and coupled to the movable partition member 21 in the housing 10, an air valve (plunger 32) disposed in the axial hole 22a which is formed in the valve body 22, can reciprocate along the axial direction of the axial hole 22a with respect to the valve body 22, and moves integrally with an input member (input shaft 31), the negative-pressure valve V1 communicating/blocking the negative-pressure chamber R1 with/from the variable-pressure chamber R2 depending on reciprocation of the plunger 32 with respect to the valve body 22, and the valve mechanism V2 communicating/blocking the variable-pressure chamber R2 with/from the atmospheric air. The valve mechanism V has a valve part 41 which the negative-pressure valve seat 22d disposed in the valve body 22, the atmospheric-pressure valve seat 32d disposed on the plunger 32, the negative-pressure valve section 41b1 constituting the negative-pressure valve V1 together with the negative-pressure valve seat 22d, and the atmospheric-pressure valve section 41b2 constituting the atmospheric-pressure valve V2 together with the atmospheric-pressure valve seat 32d are disposed, and includes the tilting part 50 formed on at least any one of the valve body 22 and the valve part 41 and relatively inclining the atmospheric-pressure valve section 41b2 with respect to the first plane (AP1) formed when the negative-pressure valve section 41b1 and the negative-pressure valve seat 22d are brought into contact with each other to block the negative-pressure valve V1.

According to this, the atmospheric-pressure valve section 41b2 of the atmospheric-pressure valve V2 is tilted by the tilting part 50 relatively with respect to the first plane (AP1) formed when the negative-pressure valve V1 is set in a blocking state (closed state). On the other hand, in an inactive state of the negative pressure-type booster device 1, before the negative-pressure valve section 41b1 and the negative-pressure valve seat 22d are in contact with each other and the atmospheric-pressure valve section 41b2 and the atmospheric-pressure valve seat 32d are separated from each other, the atmospheric-pressure valve section 41b2 of the atmospheric-pressure valve V2 is in contact with the atmospheric-pressure valve seat 32d while being elastically deformed. When the negative pressure-type booster device 1 is activated, in particular, when the atmospheric-pressure valve V2 is changed from a closed state to an open state, the elastic deformation of the atmospheric-pressure valve section 41b2 is gradually canceled by the tilting part 50 to gradually separate the atmospheric-pressure valve section 41b2 from the atmospheric-pressure valve seat 32d. At this time, a fluctuation (disturbance) in flow of the atmospheric air flowing into the variable-pressure chamber R2 through the atmospheric-pressure valve V2 can be suppressed to make it possible to suppress deterioration in braking feeling. Since the tilting part 50 is formed on the valve body 22, the valve body 22 can be manufactured in a relatively small number of steps (for example, steps performed by a molding process). More specifically, in comparison with a conventional technique, deterioration in productivity can be suppressed. Thus, the negative pressure-type booster device 1 the brake feeling of which is further improved without deteriorating the productivity can be provided.

The tilting part 50 is formed in a tapered shape inclined with respect to the plane AP0 (i.e., the plane AP2) serving as a second plane orthogonal to the axial direction of the axial hole 22a.

According to this, the tilting part 50 can be more easily formed.

On the outer peripheral edge of the movable partition member 21, the first seal part 23 blocking the communication between the negative-pressure chamber R1 and the variable-pressure chamber R2 is disposed. The first seal part 23 is formed over the circumference of the outer peripheral edge of the movable partition member 21, and includes the first annular concave part 24*d* opening toward the inner wall surface of the side plate part 11 of the housing 10 and the annular first cup seal 25 housed and held in the first annular concave part 24*d*, formed in an U-shaped section, opening toward the variable-pressure chamber R2 side, and communicating with the variable-pressure chamber R2. The first cup seal 25 includes the annular first base part 25*a* extending along the radial direction of the housing 10, the annular first outer lip part 25*b* extending from an outer peripheral side end of a first base part 25*a* toward the variable-pressure chamber R2 side and being in airtight and slidable contact with the inner wall surface of the side plate part 11, and the annular first inner lip part 25*c* extending from the inner peripheral side end of the first base part 25*a* toward the variable-pressure chamber R2 side.

According to this, when the negative pressure-type booster device 1 is activated, i.e., when the movable partition member 21 moves along the center line C of the housing 10, the first seal part 23 disposed on the outer peripheral edge of the movable partition member 21 slides along the inner wall surface of the side plate part 11 of the housing 10 in accordance with movement of the movable partition member 21. More specifically, the first cup seal 25 held in the first annular concave part 24*d* of the movable partition member 21 moves in accordance with the movement of the movable partition member 21 while the first outer lip part 25*b* of the first cup seal 25 is in airtight contact with the inner wall surface of the side plate part 11 of the housing 10. In this manner, when the movable partition member 21 moves, consequently, stress concentration can be suppressed without largely changing the movable partition member 21 in shape. As a result, negative pressure-type booster device 1 can be improved in durability.

Furthermore, axial wobbling of the movable partition member 21 with respect to the housing 10 is suppressed, and, consequently, axial wobbling of the valve body 22 to which the movable partition member 21 is coupled with respect to the housing 10 is also suppressed. As a result, a variation in inlet flow caused by wobbling generated when the atmospheric-pressure valve V2 opens can be suppressed. Thus, the brake feeling of the negative pressure-type booster device 1 can be further improved.

Furthermore, a modification of the tilting part will be described below.

<First Modification>

The first modification is different from the first embodiment described above in that, as shown in FIG. 6, a right end face of the negative-pressure communicating path 22*b*1, i.e., an end face on which the negative-pressure valve seat 22*d* is formed is inclined along the extending direction of the opening of the negative-pressure communicating path 22*b*1. A right end face of the negative-pressure communicating path 22*b*1, i.e., the end face on which the negative-pressure valve seat 22*d* is formed, as in the first embodiment described above, is formed to be inclined by a predetermined angle θ with respect to the plane AP0 orthogonal to the center line of the valve body 22. In FIG. 4, the plane AP1 (end face on which the negative-pressure valve seat 22*d* is formed) is inclined in horizontal directions with respect to the drawing plane. The plane AP1 is formed in a tapered shape such that a right side is at a high level and a left side is at a low level. In FIG. 6, the plane AP1 is inclined in longitudinal directions with respect to the drawing plane. The plane AP1 is formed in a tapered shape such that a back side is inclined to the right side and a front side is inclined to the left side. More specifically, the tilting part 50 is formed in a tapered shape inclined with respect to the plane AP0.

According to this, the tilting part 50 can be more easily formed. Each of the negative-pressure communicating paths 22*b* can be gradually opened and closed in the same manner.

<Second Modification>

Figure 7:
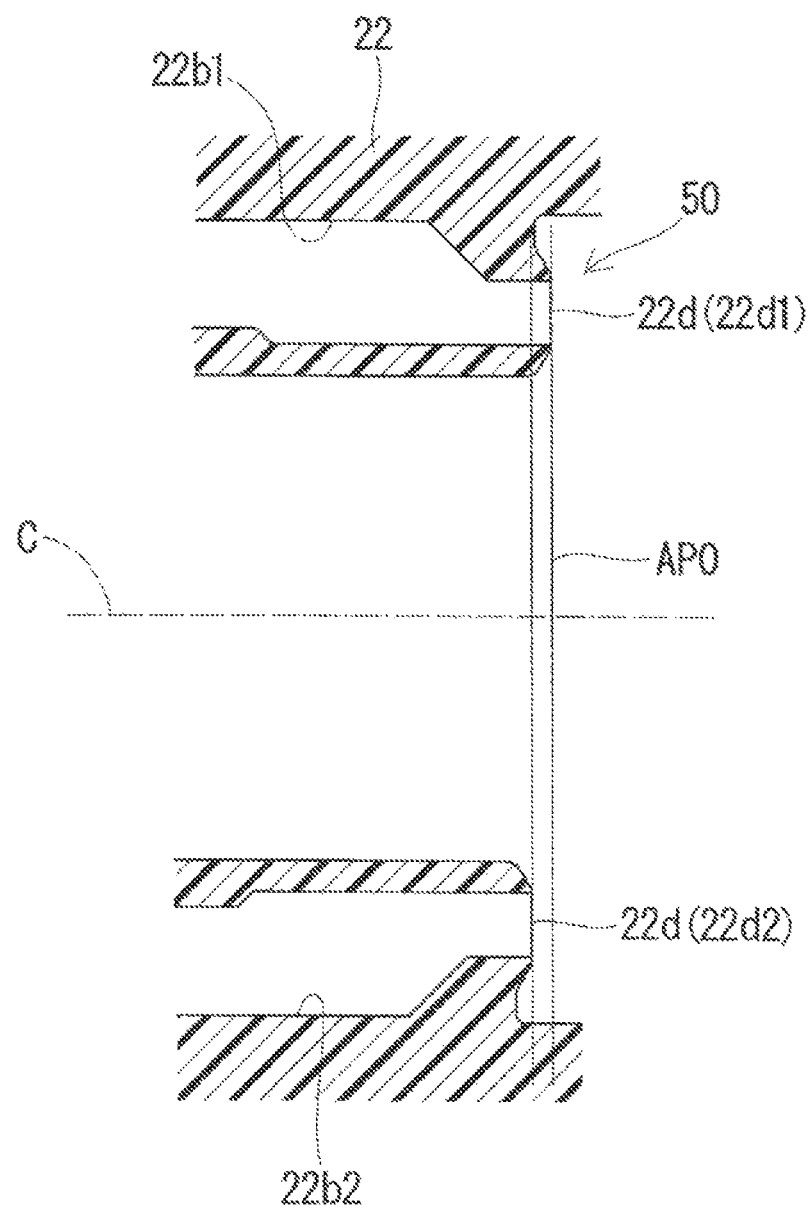
FIG. 7 is a partially enlarged sectional view of a valve body (tilting part) in accordance with a second modification of the first embodiment of a negative pressure-type booster device according to the present invention.

The second modification is different from the first embodiment described above in that, as shown in FIG. 7, when the negative pressure-type booster device includes a plurality of negative-pressure valve seats 22*d*, the tilting part 50 is configured such that an axial position of at least one negative-pressure valve seat 22*d* (for example, the negative-pressure valve seat 22*d*1 on one negative-pressure communicating path 22*b*1 side) of the plurality of negative-pressure valve seats 22*d* is different from another negative-pressure valve seat 22*d* (for example, the negative-pressure valve seat 22*d*2 on the other negative-pressure communicating path 22*b*2 side) of the plurality of negative-pressure valve seats 22*d*.

The tilting part 50 relatively inclines an atmospheric-pressure valve section 41*b*2 with respect to the first plane (AP1: see FIG. 5) formed when the negative-pressure valve section 41*b*1 and the negative-pressure valve seat 22*d* are in contact with each other to block the negative-pressure valve V1.

According to this, the tilting part 50 can be more easily formed.

<Third Modification>

Figure 8:
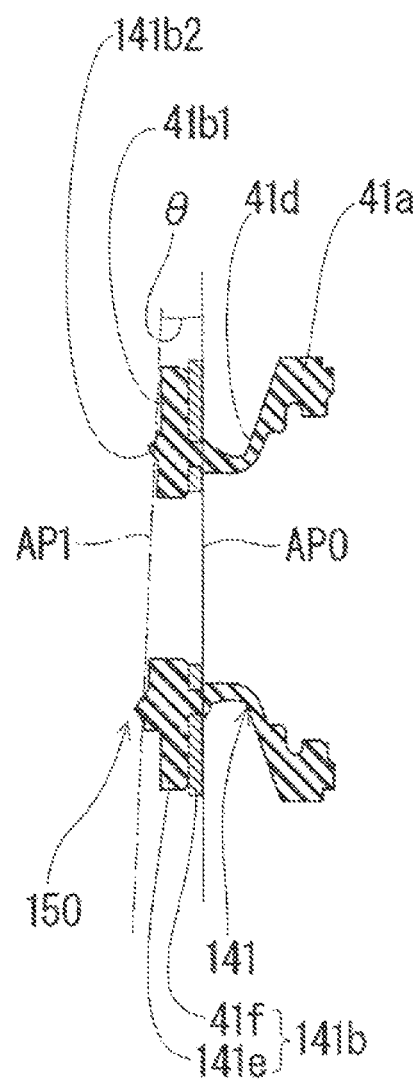
FIG. 8 is an enlarged sectional view of a valve part (tilting part) in accordance with a third modification of the first embodiment of a negative pressure-type booster device according to the present invention.

The third modification is different from the first embodiment described above in that, as shown in FIG. 8, a tilting part 150 is formed on a valve part 141. The valve part 141 has the annular mounting part 41*a* and a cylindrical movable part 141*b* which is integrally formed on the annular mounting part 41*a* and can move in the axial direction. The movable part 141*b* includes an elastic movable part 141*e* made of an elastic material and the metal movable part 41*f* formed in an annular plate-like shape and made of a metal material fixed to the rear surfaces of the elastic movable part 141*e*.

The elastic movable part 141*e* is made of an elastic plate member formed in an annular shape. A portion of the elastic movable part 141*e* on which the negative-pressure valve section 41*b*1 is formed is configured by the same method as that of the elastic movable part 41*e* according to the first embodiment. An atmospheric-pressure valve section 141*b*2 of the elastic movable part 141*e* is formed in an annular planar shape. This plane, as described above, is formed to be inclined by the predetermined angle θ with respect to the plane AP0 orthogonal to the center line of the valve body 22 (i.e., This plane is parallel with the plane AP1.). More specifically, a portion of the elastic movable part 141*e* on which an atmospheric-pressure valve section 141*b*2 is formed is formed such that a thickness on the other negative-pressure communicating path 22*b*2 side (lower side in FIG. 8) has a thickness larger than that of the one negative-pressure communicating path 22*b*1 side (upper side in FIG. 8). A tapered portion of the elastic movable part 141*e* is the tilting part 150. More specifically, the tilting part 150 is formed in a tapered shape inclined with respect to the plane AP0 (second plane).

Figure 9:
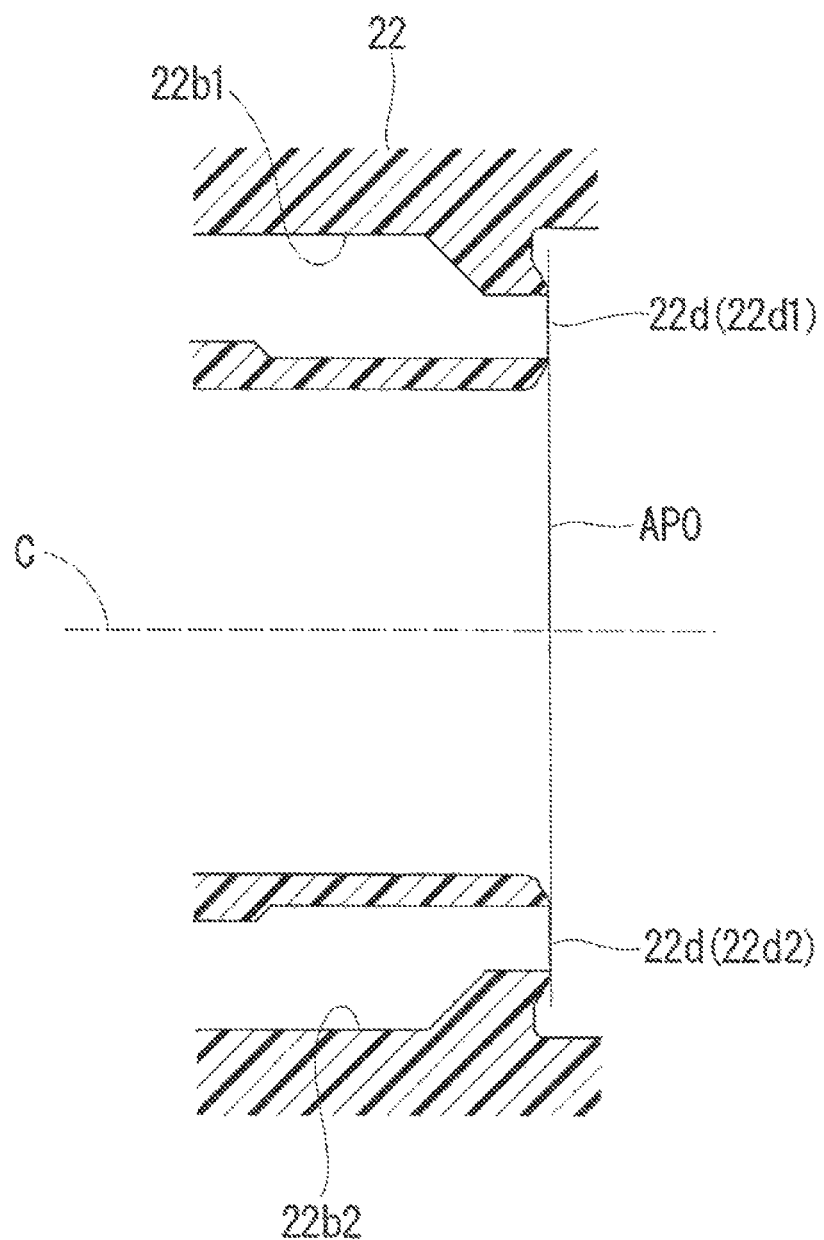
FIG. 9 is a partially enlarged sectional view of a valve body in accordance with the third modification of the first embodiment of the negative pressure-type booster device according to the present invention.

Furthermore, as shown in FIG. 9, the negative-pressure communicating paths 22*b* are formed such that the position of the negative-pressure valve seat 22*d*1 of the one negative-pressure communicating path 22*b*1 in the axial direction is the same as that of the negative-pressure valve seat 22*d*2 of the negative-pressure communicating path 22*b*2. More specifically, both the negative-pressure valve seats 22d1 and 22d2 are located on the same plane (AP0).

The tilting part 150 is formed on the valve part 141 and relatively inclines an atmospheric-pressure valve section 141b2 with respect to the plane AP0 serving as the first plane formed when the negative-pressure valve section 41b1 and the negative-pressure valve seat 22d are in contact with each other to block the negative-pressure valve V1. More specifically, the plane AP0 of the negative-pressure valve seat 22 is inclined by the predetermined angle θ with respect to the plane AP2 of the atmospheric-pressure valve section 141b2. The tilting part 150 is formed on the valve part 141, and may tilt the atmospheric-pressure valve section 141b2 in comparison with the atmospheric-pressure valve section 141b2 obtained before the contact with respect to a plane AP2 being in contact with the atmospheric-pressure valve section 141b2 on the atmospheric-pressure valve seat 32d when the negative-pressure valve section 41b1 and the negative-pressure valve seat 22d are in contact with each other.

According to this, the atmospheric-pressure valve section 141b2 of the atmospheric-pressure valve V2 is tilted by the tilting part 150 relatively with respect to the first plane (AP0) formed when the negative-pressure valve V1 is set in a blocking state (closed state). On the other hand, in an inactive state of the negative pressure-type booster device 1, before the negative-pressure valve section 41b1 and the negative-pressure valve seat 22d are in contact with each other and the atmospheric-pressure valve section 141b2 and the atmospheric-pressure valve seat 32d are separated from each other, the atmospheric-pressure valve section 141b2 of the atmospheric-pressure valve V2 is in contact with the atmospheric-pressure valve seat 32d while being elastically deformed. When the negative pressure-type booster device 1 is activated, in particular, when the atmospheric-pressure valve V2 is changed from a closed state to an open state, the elastic deformation of the atmospheric-pressure valve section 141b2 is gradually canceled by the tilting part 150 to gradually separate the atmospheric-pressure valve section 141b2 from the atmospheric-pressure valve seat 32d. At this time, a fluctuation (disturbance) in flow of the atmospheric air flowing into the variable-pressure chamber R2 through the atmospheric-pressure valve V2 can be suppressed to make it possible to suppress deterioration in braking feeling. Since the tilting part 150 is formed on the valve part 41, the valve part 41 can be manufactured in a relatively small number of steps (for example, steps performed by a molding process). More specifically, in comparison with a conventional technique, deterioration in productivity can be suppressed. Thus, the negative pressure-type booster device 1 the brake feeling of which is further improved without deteriorating the productivity can be provided.

The tilting part may be formed on at least any one of the valve body 22 and the valve part 41. The tilting part relatively inclines the atmospheric-pressure valve section 41b2 with respect to the first plane formed when the negative-pressure valve section 41b1 and the negative-pressure valve seat 22d are in contact with each other to block the negative-pressure valve V1.

In the embodiment described above, although only two negative-pressure valve seats 22d (i.e., the negative-pressure communicating paths 22b) are disposed, three or more negative-pressure valve seats 22d (i.e., the negative-pressure communicating paths 22b) may be disposed.

Furthermore, a modification of the cup seal will be described below.

<Fourth Modification>

Figure 10:
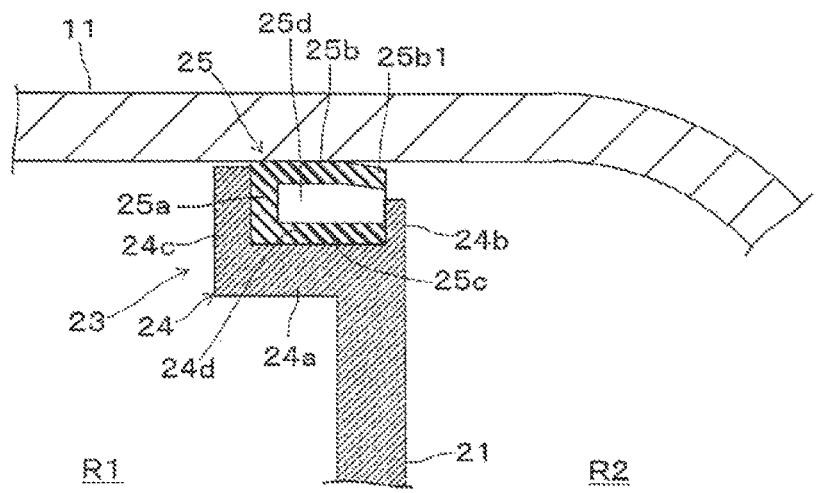
FIG. 10 is an enlarged sectional view showing a fourth modification of the first embodiment of the negative pressure-type booster device according to the present invention, and mainly showing a first seal part.

The fourth modification is different from the first embodiment described above in that, as shown in FIG. 10, a free end of the first outer lip part 25b has an inclined part 25b1 inclined toward the inside thereof in the radial direction.

According to this, when the movable partition member 21 moves forward, as in the first embodiment described above, the first cup seal 25 communicating with the variable-pressure chamber R2 expands to the outside. More specifically, the outside surface of the inclined part 25b1 is also in contact with the side plate part 11 of the housing 10. As a result, since the sealing property of the first seal part 23 is improved, the movable partition member 21 can move forward while keeping the sealing property high.

On the other hand, when the movable partition member 21 moves backward, since the negative-pressure chamber R1 and the variable-pressure chamber R2 have negative pressures equal to each other, the free end of the first outer lip part 25b returns to the original inclined shape. Thus, when the movable partition member 21 moves to the variable-pressure chamber R2 side, the free end can be prevented from being stuck on the inner wall surface of the side plate part 11 of the housing 10. As a result, curling of the first outer lip part 25b can be suppressed.

<Fifth Modification>

Figure 11:
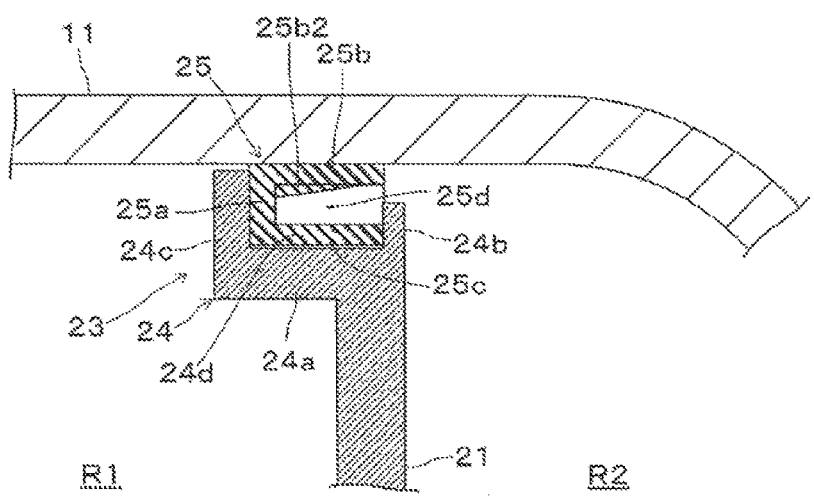
FIG. 11 is an enlarged sectional view showing a fifth modification of the first embodiment of the negative pressure-type booster device according to the present invention, and mainly showing a first seal part.

The fifth modification is different from the first embodiment described above in that, as shown in FIG. 11, an inner peripheral wall surface of the first outer lip part 25b has a thick part 25b2 convexly projected and extended along the extending direction of the center line C of the housing 10. The thick part 25b2 preferably has a thickness larger than that of the first outer lip part 25b according to the first embodiment. The thick part 25b2 preferably has a thickness larger than that of the first base part 25a or the first inner lip part 25c according to the first embodiment. The thick part 25b2 is preferably formed to be tapered and may have a uniform thickness. The thick part 25b2 may be disposed over the circumference of the inner wall of the first outer lip part 25b, and may be partially formed (in the form of ribs) at predetermined intervals on the inner peripheral wall of the first outer lip part 25b.

According to this, the strength of the first outer lip part 25b to warpage (in particular, warpage to the outside) can be improved by the thick part 25b2. Thus, when the movable partition member 21 moves to the variable-pressure chamber R2 side, curling of the first outer lip part 25b can be suppressed.

<Sixth Modification>

Figure 12:
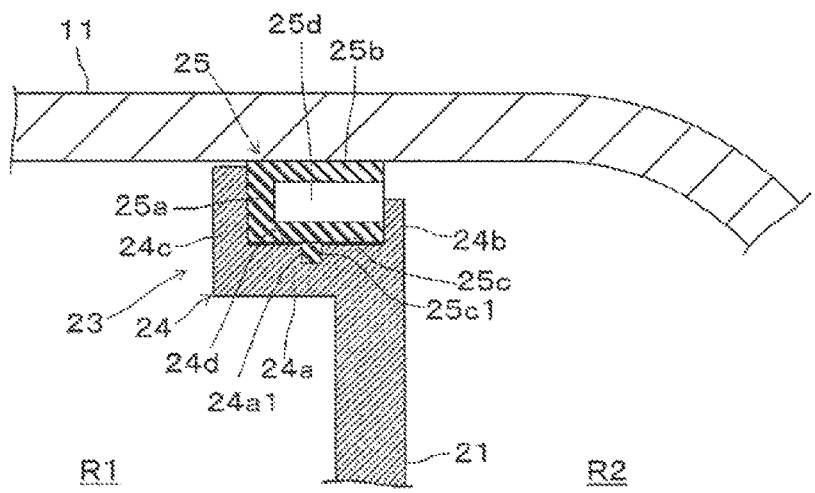
FIG. 12 is an enlarged sectional view showing a sixth modification of the first embodiment of the negative pressure-type booster device according to the present invention, and mainly showing a first seal part.

The sixth modification is different from the first embodiment described above in that, as shown in FIG. 12, in the first annular concave part 24d, a first engagement concave part 24a1 is formed in the base part 24a and, as the first inner lip part 25c, a second engagement convex part 25c1 engaged with the first engagement concave part 24a1 of the first annular concave part 24d is formed on the first inner lip part 25c. A first engagement convex part (not shown) may be formed in place of the first engagement concave part 24a1 in the first annular concave part 24d, and a second engagement concave part (not shown) engaged with the first engagement convex part of the first annular concave part 24d may be formed in place of the second engagement convex part 25c1 in the first inner lip part 25c.

According to this, when the first engagement concave part 24a1 and the second engagement convex part 25c1 are engaged with each other (or the first engagement convex part and the second engagement concave part are engaged with each other), the first inner lip part 25c, consequently, the first cup seal 25 can be reliably positioned in the first annular concave part 24d.

<Seventh Modification>

Figure 13:
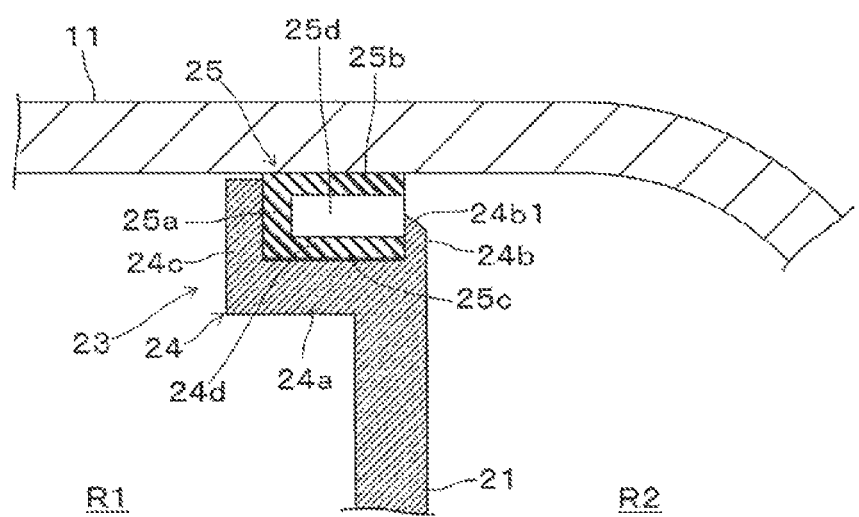
FIG. 13 is an enlarged sectional view showing a seventh modification of the first embodiment of the negative pressure-type booster device according to the present invention, and mainly showing a first seal part.

This seventh modification is different from the first embodiment described above in that, as shown in FIG. 13, a negative-pressure booster device further includes an inclined part 24b1 which is formed on the rear projecting part 24b serving as an opening end outside wall surface of the holding part 24 and guides the first cup seal 25 when the first cup seal 25 is disposed in the first annular concave part 24d. The inclined part 24b1 is inclined such that the length of the rear projecting part 24b decreases from the inside surface of the inclined part 24b1 toward the outside surface thereof (from the left to the right in FIG. 13).

According to this, when the first cup seal 25 is disposed in the first annular concave part 24d, the first cup seal 25 is guided by the inclined part 24b1. More specifically, when the first cup seal 25 is slid on the inclined part 24b1 while being spread, the first cup seal 25 can be disposed in the first annular concave part 24d. Thus, the first cup seal 25 can be improved in mounting property.

Second Embodiment

Figure 14:
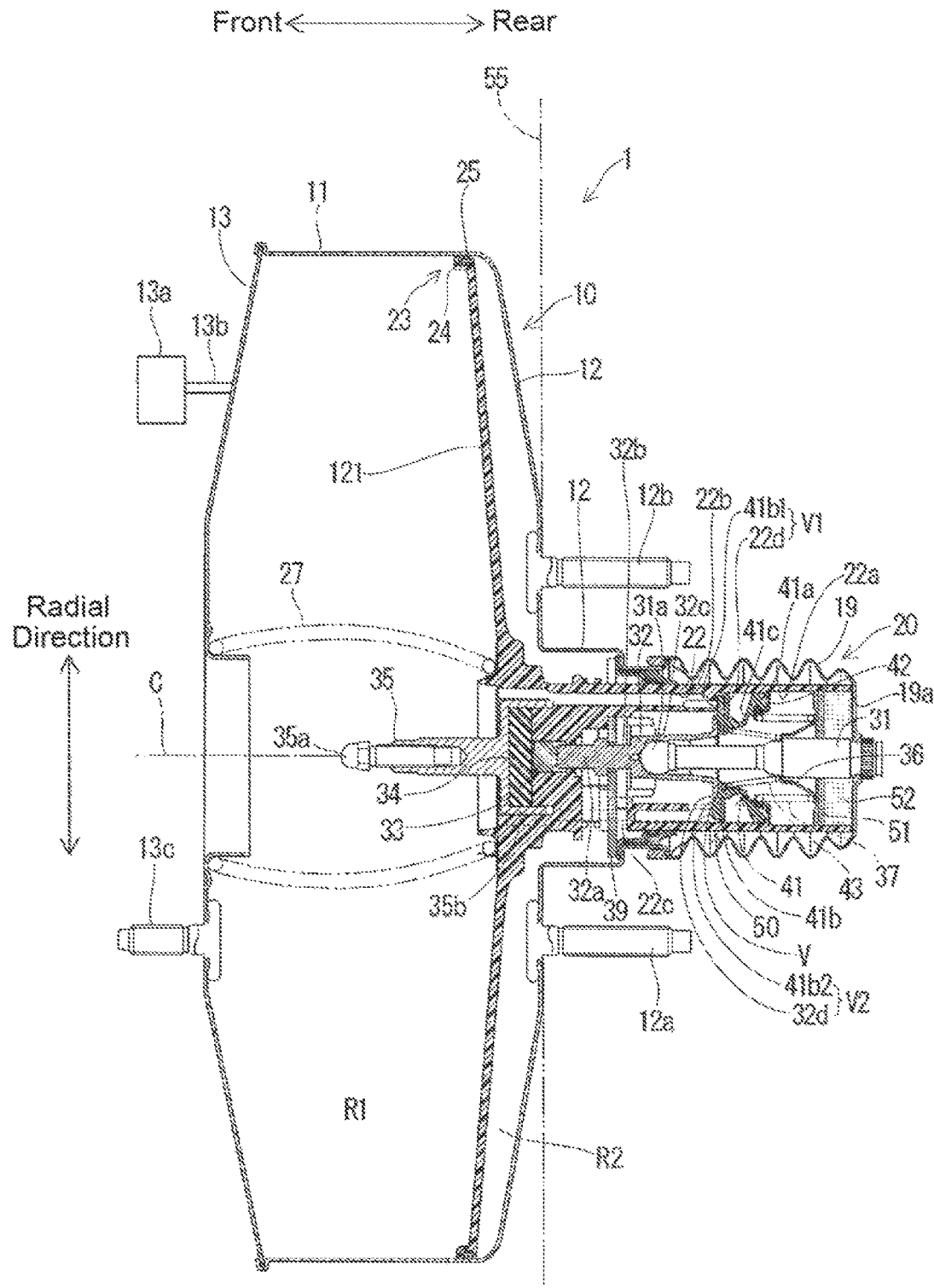
FIG. 14 is a sectional view showing a second embodiment of the negative pressure-type booster device according to the present invention.

Furthermore, a negative pressure-type booster device 1 according to a second embodiment will be described below. The second embodiment is different from the first embodiment described above in that, as shown in FIG. 14, a movable partition member 121 is formed integrally with the valve body 22.

The movable partition member 121 is preferably molded with a resin material integrally with the valve body 22. The movable partition member 121 has a planar shape and is formed in an annular shape. The inner peripheral edge of the movable partition member 21 is fixed to the outer peripheral front end of the valve body 22. The fixing member 26 used in the first embodiment described above is not necessary. As in the first embodiment, the first seal part 23 is disposed on the outer peripheral edge of the movable partition member 121.

Third Embodiment

Furthermore, a negative pressure-type booster device 1 according to a third embodiment will be described below. The third embodiment is different from the second embodiment described above in that, as shown in FIG. 15, the negative pressure-type booster device includes a tie rod bolt 60. The negative pressure-type booster device 1 according to the third embodiment further includes the tie rod bolt 60 which airtightly penetrates the housing 10 and a movable partition member 221 and mounts the housing 10 on the mounting-target member 55 of the vehicle.

Figure 15:
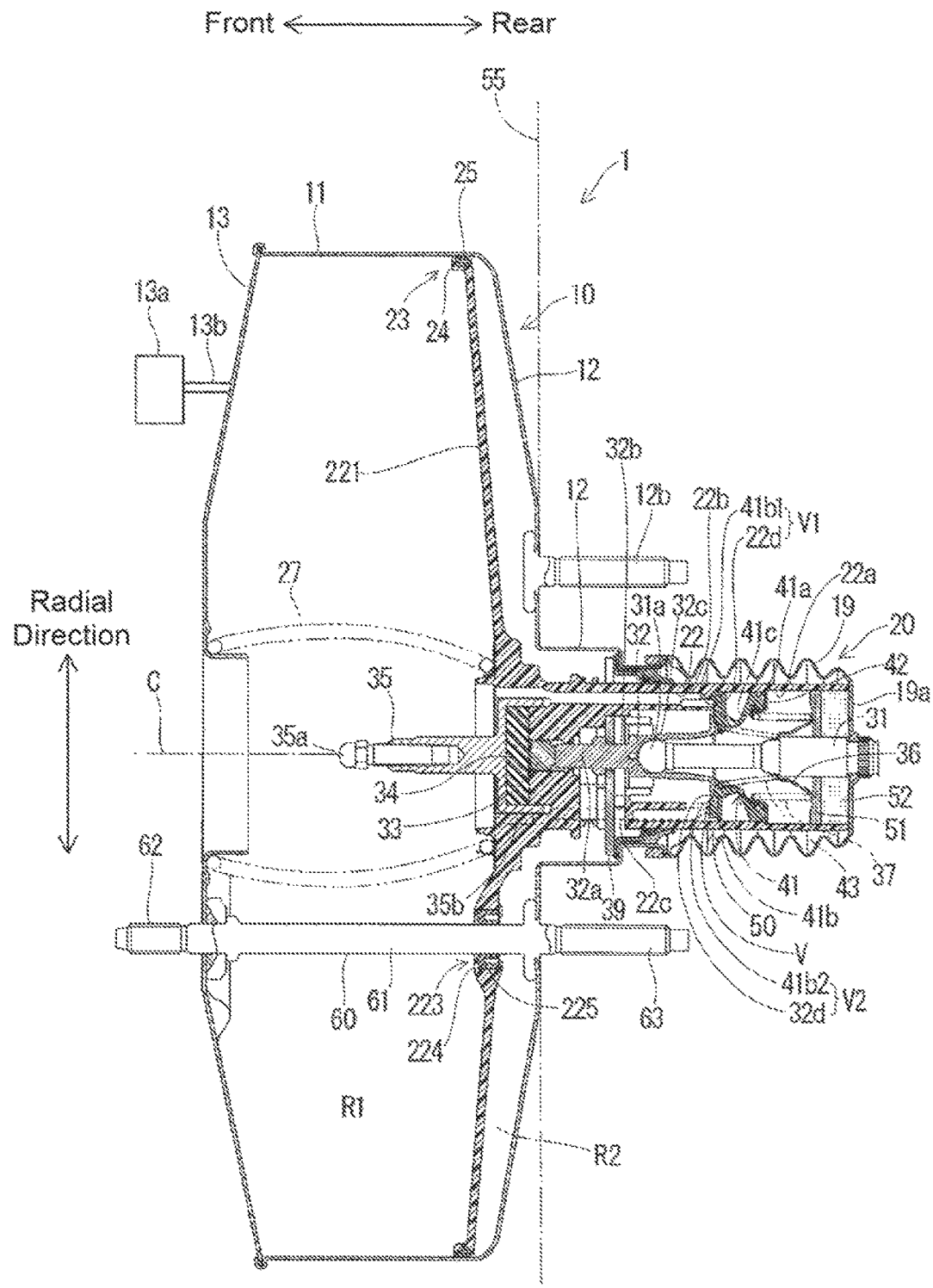
FIG. 15 is a sectional view showing a third embodiment of the negative pressure-type booster device according to the present invention.

As the tie rod bolt 60, one pair of tie rod bolts are disposed (only one tie rod bolt is shown in FIG. 15) and airtightly penetrate the housing 10 and the movable partition member 221. The tie rod bolt 60 includes a main body part 61 formed in a rod-like shape (for example, columnar shape), a front end part 62 formed by extending the front end of the main body part 61 along the axial direction, and a rear end part 63 formed by extending the rear end of the main body part 61 along the axial direction.

A second seal part 223 blocking the communication between the negative-pressure chamber R1 and the variable-pressure chamber R2 is disposed in a through-hole part 221a of the movable partition member 221 which the tie rod bolt 60 penetrates.

Figure 16:
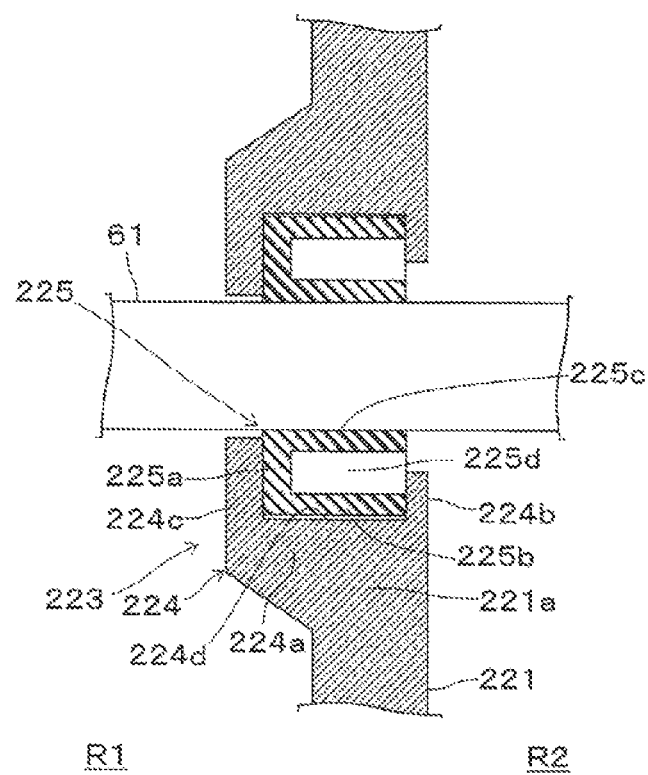
FIG. 16 is an enlarged sectional view mainly showing a second seal part shown in FIG. 15.

The second seal part 223, mainly shown in FIG. 16, is formed over the inner periphery of the through-hole part 221a and includes a second annular concave part 224d opening toward the outer wall surface of the tie rod bolt 60 and an annular second cup seal 225 housed and held in the second annular concave part 224d, formed in an U-shaped section, opening toward the variable-pressure chamber R2 side, and communicating with the variable-pressure chamber R2.

The second annular concave part 224d is formed in a holding part 224 having a U-shaped section and formed over the circumference of the inner periphery in the through-hole part 221a of the movable partition member 221.

The holding part 224 includes an annular base part 224a extending along the extending direction of the center line C of the housing 10, an annular rear projecting part 224b extending from a rear-side end of the base part 224a toward the radial inside of the through-hole part 221a, and an annular front projecting part 224c extending from a front-side end of the base part 224a to a radial inside of the through-hole part 221a. The second annular concave part 224d is a concave part formed by the base part 224a, the rear projecting part 224b, and the front projecting part 224c. The base part 224a is disposed integrally with the through-hole part 221a of the movable partition member 221.

The second cup seal 225 includes an annular second base part 225a extending along a radial direction of the housing 10 (radial direction of the through-hole part 221a), an annular second outer lip part 225b extending from an outer peripheral side end of a second base part 225a toward the variable-pressure chamber R2 side, an annular second inner lip part 225c extending from an inner peripheral side end of the second base part 225a toward the variable-pressure chamber R2 side and being in airtight and slidable contact with an outer wall surface of the tie rod bolt 60 (the main body part 61 of the tie rod bolt 60), and an internal space 225d formed by the second base part 225a, the second outer lip part 225b, and the second inner lip part 225c.

According to this, when the negative pressure-type booster device 1 having the tie rod bolt 60 is activated, i.e., when the movable partition member 221 moves along the center line C of the housing 10, the second seal part 223 disposed in the through-hole part 221a of the movable partition member 221 slides along the outer wall surface of the tie rod bolt 60 in accordance with movement of the movable partition member 221. More specifically, the second cup seal 225 held in the second annular concave part 224d of the movable partition member 221 moves in accordance with the movement of the movable partition member 221 while the second inner lip part 225c of the second cup seal 225 is in airtight contact with the outer wall surface of the tie rod bolt 60. In this manner, when the movable partition member 221 moves, consequently, stress concentration can be suppressed without largely changing the movable partition member 221 in shape. As a result, the negative pressure-type booster device 1 having the tie rod bolt 60 can be improved in durability.

In the third embodiment, the tie rod bolt 60 is configured to penetrate the movable partition member 221 formed integrally with the valve body 22. However, the tie rod bolt 60 may be configured to penetrate the movable partition member 21 disposed independently of the valve body 22 as in the first embodiment described above.

The invention claimed is:

1. A negative pressure-type booster device comprising a valve mechanism including:
   a movable partition member dividing an inside of a housing into a negative-pressure chamber and a variable-pressure chamber;
   a valve body reciprocally mounted in the housing and coupled to the movable partition member in the housing;
   an air valve which is disposed in an axial hole formed in the valve body, can be reciprocated along an axial direction of the axial hole with respect to the valve body, and moves integrally with an input member;
   a negative-pressure valve communicating/blocking the negative-pressure chamber with/from the variable-pressure chamber depending on reciprocation of the air valve with respect to the valve body; and
   an atmospheric-pressure valve communicating/blocking the variable-pressure chamber with/from atmospheric air, wherein
   the valve mechanism has a valve part in which a negative-pressure valve seat disposed on the valve body, an atmospheric-pressure valve seat disposed on the air valve, a negative-pressure valve section constituting the negative-pressure valve together with the negative-pressure valve seat, and an atmospheric-pressure valve section constituting the atmospheric-pressure valve together with the atmospheric-pressure valve seat are disposed, and
   includes a tilting part which is formed by at least any one of the valve body and the valve part and tilts the atmospheric-pressure valve section with respect to a first plane formed when the negative-pressure valve section and the negative-pressure valve seat are brought into contact with each other to set the negative-pressure valve in a blocking state.

2. The negative pressure-type booster device according to claim 1, wherein the tilting part is formed in a tapered shape inclined with respect to a second plane orthogonal to the axial direction of the axial hole.

3. The negative pressure-type booster device according to claim 2, wherein
   a first seal part blocking the communication between the negative-pressure chamber and the variable-pressure chamber is disposed on an outer peripheral edge of the movable partition member,
   the first seal part includes a first annular concave part which is formed over a circumference of the outer peripheral edge of the movable partition member and opens toward an inner wall surface of a side plate part of the housing, and an annular first cup seal which is housed and held in the first annular concave part, is formed in a shape having a U-shaped section, opens toward a variable-pressure chamber side, and communicates with the variable-pressure chamber, and
   the first cup seal includes an annular first base part extending in a radial direction of the housing, an annular first outer lip part which extends from an outer peripheral side end of the first base part toward the variable-pressure chamber side and is in airtight and slidable contact with the inner wall surface of the side plate part, and an annular first inner lip part extending from an inner peripheral side edge toward the variable-pressure chamber side.

4. The negative pressure-type booster device according to claim 1, wherein, when the negative pressure-type booster device includes a plurality of the negative-pressure valve seats, the tilting part is configured such that a position of at least one negative-pressure valve seat of the plurality of negative-pressure valve seats in the axial direction of the axial hole is different from those of other negative-pressure valve seats of the plurality of negative-pressure valve seats.

5. The negative pressure-type booster device according to claim 4, wherein
   a first seal part blocking the communication between the negative-pressure chamber and the variable-pressure chamber is disposed on an outer peripheral edge of the movable partition member,
   the first seal part includes a first annular concave part which is formed over a circumference of the outer peripheral edge of the movable partition member and opens toward an inner wall surface of a side plate part of the housing, and an annular first cup seal which is housed and held in the first annular concave part, is formed in a shape having a U-shaped section, opens toward a variable-pressure chamber side, and communicates with the variable-pressure chamber, and
   the first cup seal includes an annular first base part extending in a radial direction of the housing, an annular first outer lip part which extends from an outer peripheral side end of the first base part toward the variable-pressure chamber side and is in airtight and slidable contact with the inner wall surface of the side plate part, and an annular first inner lip part extending from an inner peripheral side edge toward the variable-pressure chamber side.

6. The negative pressure-type booster device according to claim 1, wherein
   a first seal part blocking the communication between the negative-pressure chamber and the variable-pressure chamber is disposed on an outer peripheral edge of the movable partition member,
   the first seal part includes a first annular concave part which is formed over a circumference of the outer peripheral edge of the movable partition member and opens toward an inner wall surface of a side plate part of the housing, and an annular first cup seal which is housed and held in the first annular concave part, is formed in a shape having a U-shaped section, opens toward a variable-pressure chamber side, and communicates with the variable-pressure chamber, and
   the first cup seal includes an annular first base part extending in a radial direction of the housing, an annular first outer lip part which extends from an outer peripheral side end of the first base part toward the variable-pressure chamber side and is in airtight and slidable contact with the inner wall surface of the side plate part, and an annular first inner lip part extending from an inner peripheral side edge toward the variable-pressure chamber side.

* * * * *